(12) United States Patent
Boelitz et al.

(10) Patent No.: US 8,729,442 B2
(45) Date of Patent: May 20, 2014

(54) PREDICTING AND CORRECTING TRAJECTORIES

(75) Inventors: Frederick W. Boelitz, Sammamish, WA (US); Mark O. Hilstad, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 655 days.

(21) Appl. No.: 12/816,284

(22) Filed: Jun. 15, 2010

(65) Prior Publication Data

US 2010/0314487 A1     Dec. 16, 2010

Related U.S. Application Data

(60) Provisional application No. 61/187,249, filed on Jun. 15, 2009, provisional application No. 61/187,250, filed on Jun. 15, 2009.

(51) Int. Cl.
| | | |
|---|---|---|
| *B64G 1/24* | (2006.01) | |
| *B64G 1/26* | (2006.01) | |
| *F42B 15/01* | (2006.01) | |
| *F42B 10/60* | (2006.01) | |
| *F42B 10/62* | (2006.01) | |
| *B64G 1/00* | (2006.01) | |
| *F42B 15/00* | (2006.01) | |
| *F42B 10/00* | (2006.01) | |

(52) U.S. Cl.
USPC .......... 244/3.1; 235/400; 235/404; 235/417; 244/3.15; 244/3.21; 244/3.22; 244/3.24; 244/158.1; 244/158.9; 244/164; 244/169; 244/171; 244/171.1; 700/1; 700/28; 700/29

(58) Field of Classification Search
USPC ............ 244/3.1–3.3, 158.1, 158.9, 164, 171, 244/171.1–171.5, 75.1, 76 R, 175, 183, 169; 235/400–418; 356/450, 519; 700/1, 28, 700/32, 33, 44, 45
See application file for complete search history.

(56) References Cited

U.S. PATENT DOCUMENTS

| | | | | |
|---|---|---|---|---|
| 3,305,194 | A | * | 2/1967 | Conard et al. ............... 244/3.21 |
| 3,362,658 | A | * | 1/1968 | Ito et al. ........................ 244/3.2 |
| 3,568,954 | A | * | 3/1971 | McCorkle, Jr. ............... 244/3.2 |
| 3,693,909 | A | * | 9/1972 | Hall .............................. 244/3.2 |
| 3,891,166 | A | * | 6/1975 | May ............................. 244/3.22 |
| 3,966,142 | A | | 6/1976 | Corbett et al. |
| 4,008,869 | A | * | 2/1977 | Weiss ........................... 244/3.13 |
| 4,111,382 | A | * | 9/1978 | Kissinger ..................... 244/3.1 |
| 5,052,638 | A | | 10/1991 | Minovitch |
| 5,318,256 | A | | 6/1994 | Appleberry |
| 5,568,901 | A | | 10/1996 | Stiennon |
| 5,593,110 | A | * | 1/1997 | Ransom et al. ............. 244/3.23 |

(Continued)

OTHER PUBLICATIONS

International Search Report and Written Opinion, International Application No. PCT/US2010/038722, Applicant: Blue Origin, LLC., mailed Aug. 18, 2010, 13 pages.

*Primary Examiner* — Bernarr Gregory
(74) *Attorney, Agent, or Firm* — Perkins Coie LLP (57) ABSTRACT

Technology for predicting and correcting a trajectory is described. The technology can create a model to predict a position of the reusable launch vehicle at a time in the future; observe a wind condition during ascent of the reusable launch vehicle; store the observed wind condition in a wind map; predict during ascent a position and a terminal lateral velocity of the reusable launch vehicle at a terminal altitude; and correct a flight trajectory of the reusable launch vehicle based on the wind map.

36 Claims, 7 Drawing Sheets

(56) References Cited

U.S. PATENT DOCUMENTS

| | | | |
|---|---|---|---|
| 5,647,558 A * | 7/1997 | Linick | 244/3.11 |
| 5,695,152 A * | 12/1997 | Levy | 244/3.13 |
| 5,804,812 A * | 9/1998 | Wicke | 244/3.1 |
| 5,873,549 A | 2/1999 | Lane et al. | |
| 5,927,653 A | 7/1999 | Mueller et al. | |
| 6,254,030 B1 * | 7/2001 | Sloan et al. | 244/3.21 |
| 6,364,252 B1 | 4/2002 | Anderman | |
| 6,380,526 B1 * | 4/2002 | Kau | 244/3.2 |
| 6,457,306 B1 | 10/2002 | Abel et al. | |
| 6,467,721 B1 * | 10/2002 | Kautzsch et al. | 244/3.11 |
| 6,468,721 B1 | 10/2002 | Twist et al. | |
| 6,502,786 B2 * | 1/2003 | Rupert et al. | 244/3.27 |
| 6,574,532 B2 * | 6/2003 | Lohmiller | 244/183 |
| 6,666,402 B2 * | 12/2003 | Rupert et al. | 244/3.27 |
| 6,666,410 B2 * | 12/2003 | Boelitz et al. | 244/171.1 |
| 6,817,580 B2 | 11/2004 | Smith | |
| 6,941,177 B2 * | 9/2005 | Jackson et al. | 700/33 |
| 6,993,397 B2 * | 1/2006 | Jackson et al. | 700/45 |
| 7,280,917 B2 * | 10/2007 | Hager et al. | 244/164 |
| 7,499,181 B2 * | 3/2009 | Mirand et al. | 356/519 |
| 7,566,026 B2 * | 7/2009 | Lam et al. | 244/3.15 |
| 2003/0150961 A1 | 8/2003 | Boelitz et al. | |
| 2003/0192984 A1 | 10/2003 | Smith | |
| 2005/0278120 A1 | 12/2005 | Manfred et al. | |
| 2010/0031448 A1 | 2/2010 | Hijlkema | |
| 2010/0314497 A1 | 12/2010 | Boelitz | |

\* cited by examiner

PREDICTING AND CORRECTING TRAJECTORIES

CROSS-REFERENCE TO RELATED APPLICATION(S)

This application claims the benefit of U.S. Provisional Patent Application No. 61/187,249 filed on Jun. 15, 2009, entitled Predicting and Correcting Trajectories, and U.S. Provisional Patent Application No. 61/187,250, filed on Jun. 15, 2009, entitled Predicting and Correcting Trajectories, both of which are hereby incorporated by reference in their entireties. This application is related to U.S. patent application Ser. No. 12/816,267, filed Jun. 15, 2010, which is incorporated by reference herein in its entirety now U.S. Pat. No. 8,424,808.

TECHNICAL FIELD

The present disclosure relates generally to airborne vehicles (e.g., space launch vehicles) and, more particularly, to predicting and correcting the trajectory of reusable launch vehicles.

BACKGROUND

Rocket powered launch vehicles (e.g., space launch vehicles) have been used for many years to carry human and non-human payloads into space. Rockets delivered humans into Earth orbit and to the moon, and have launched many satellites into Earth orbit or beyond. More recently, rockets have been used to launch unmanned space probes and to deliver supplies and personnel to the orbiting International Space Station.

Despite advances in manned and unmanned space flight, delivering astronauts, satellites, and other payloads to space continues to be very expensive. A reason is that all or portions of conventional launch vehicles are used only once. Such vehicles are referred to as "expendable launch vehicles" (ELVs). An example of an ELV is a conventional, multi-stage rocket that delivers a satellite to space: only the payload survives the journey and all other components are jettisoned or otherwise expended. An example of a partially reusable vehicle is the NASA space shuttle. The space shuttle's main external fuel tank is used only once whereas its main engines, two solid rocket boosters, and the space shuttle itself are reusable after substantial reconditioning. Although NASA's space shuttle is only partially expended and is largely reusable, reconditioning the reusable components is a costly and time consuming process that requires an extensive ground-based infrastructure.

As commercial interest in access to space increases, a need remains to reduce costs significantly. Various reusable launch vehicles (RLVs) have been proposed to reduce costs because a significant portion of such vehicles can be completely reused with much less reconditioning than the space shuttle requires.

DETAILED DESCRIPTION

Methods and systems (collectively, "technology") for predicting and correcting the trajectory of at least partially reusable launch vehicles (RLVs) are described. An RLV can employ the technology to continually monitor its position and environment and make course corrections during ascent such that the wind will cause the RLV to drift towards a specified landing site after propulsion devices are turned off (e.g., main engine cutoff or "MECO"). Generally, the RLV will ascend using thrust from one or more rocket engines or other propulsion devices, attain an apogee, and descend due to gravitational pull. During ascent, the RLV can guide its trajectory by commanding its propulsion devices and moveable aerodynamic control surfaces to cause the RLV to change its course. After MECO, gravity will eventually overcome the RLV's momentum and the RLV will then begin an un-powered descent because of gravity's downward force. The RLV can deploy various surfaces to slow its descent and/or adjust its aerodynamic characteristics (e.g., lift and/or drag). Examples of such surfaces are deployable flared aerodynamic control surfaces, parachutes, etc. The RLV may also employ propulsion devices, such as rocket engines or other propulsion devices, to further slow descent prior to landing.

In various embodiments, in addition to making course corrections during ascent, the RLV can compute and store a "wind map" in its memory. The wind map indicates, at multiple altitudes, the speed and direction of wind the RLV experienced. The RLV may compute the wind map by comparing its predicted rigid-body state at specified times and with its actual state at those times. As an example, the RLV may use one or more inertial navigation systems, global position units, other radiofrequency-based devices, or any other suitable devices or techniques for determining the RLV's state. Based on its momentum and flight characteristics, the RLV can compute its predicted position at a time T in the future. At that time T, the RLV can determine its actual position (e.g., based on inputs from inertial navigation systems) and compare that actual position with its predicted position. The difference between the predicted and actual positions of the RLV corresponds to the effect of the wind on the RLV. The RLV can make this computation at any resolution of time that is reasonable based on the frequency with which it is able to receive, compute, and store the position information.

In various embodiments, the RLV employs a wind map when predicting the drift of the vehicle after MECO. The wind map indicates, at multiple altitudes, the speed and direction of wind expected and/or encountered. In various embodiments, the RLV may employ a pre-loaded wind map as a starting point. This pre-loaded wind map may include information collected from government or private entities (e.g., National Oceanic and Atmospheric Administration) that measure winds aloft (e.g., to predict weather). These entities may collect this wind information from various weather balloons or other devices. The information may also be based on historical wind data. The RLV may be initially programmed with a trajectory based on the known wind map so that it can land at a specified landing site. In various embodiments, the RLV may create the wind map or modify the pre-loaded wind map by using a wind estimator during ascent so that it can descend to the specified landing site more precisely than would have been possible with just the pre-loaded wind map.

In various embodiments, RLVs can be programmed with a specified trajectory prior to liftoff. For example, RLVs can be programmed to lift off from a launch site, attain an apogee, and land at a landing site. In various embodiments, the RLV can lift off and land vertically. The launch site and the landing site can be at approximately the same location or at different locations. In various embodiments, the landing site can be a moving surface, such as a sea-based landing site. The landing site may be changed after liftoff, e.g., if the originally-selected landing site is no longer usable for any reason. As previously described, the RLV can select its trajectory so that it can return to the selected landing site due to free-fall gravitational and aerodynamic forces, thereby minimizing the use of propulsion sources or aerodynamic control surfaces. The RLV continually corrects its programmed trajectory to enable this to occur.

The technology will now be described with reference to the Figures. In the Figures, identical reference numbers identify identical or at least generally similar elements. To facilitate the discussion of any particular element, the most significant digit or digits of any reference number refers to the Figure in which that element is first introduced. For example, element 100 is first introduced and discussed with reference to FIG. 1.

Figure 1A:
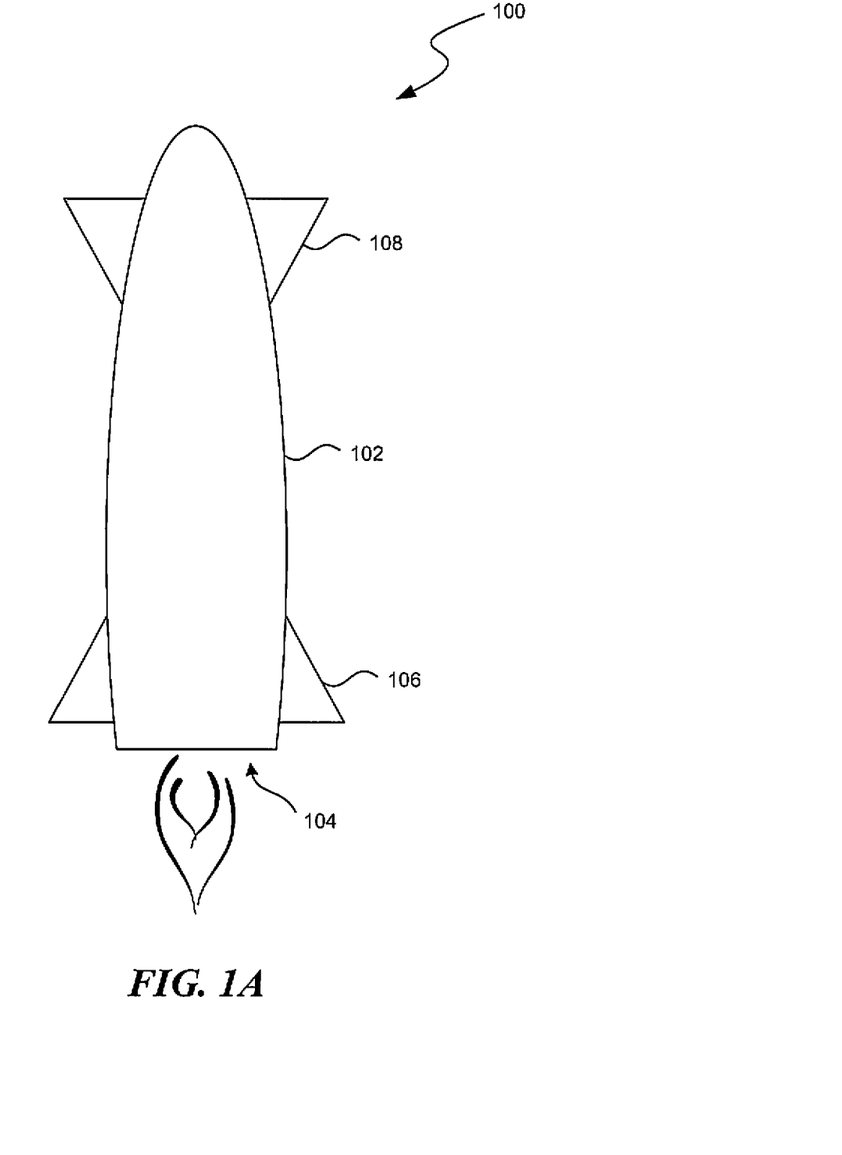
FIG. 1A is a partially schematic illustration of a reusable launch vehicle configured in accordance with various embodiments of the disclosure.

FIG. 1A is a partially schematic illustration of a reusable launch vehicle (RLV) 100 configured in accordance with various embodiments of the disclosure. The RLV 100 can include a main section 102, a propulsion device 104, and various aerodynamic control surfaces 106 and 108. In various embodiments, the main section 102 can carry various payloads, such as humans, satellites, and/or other payloads.

The propulsion device 104 can be a rocket-based propulsion device or other propulsion device. The RLV can include multiple propulsion devices 104 (not illustrated). Some propulsion devices can be larger or smaller than other propulsion devices. The propulsion devices can be attached to various surfaces and can be moveable (e.g., as moveable thrusters, engines, or motors that can vector thrust in various directions).

The RLV can include one or more moveable aerodynamic control surfaces 106 that permit the RLV to change its trajectory. The RLV can command these moveable aerodynamic control surfaces 106 (e.g., to expand, contract, rotate about an axis, etc.) to change its flight profile during ascent or descent.

The RLV can also include one or more deployable aerodynamic control surfaces 108 (e.g., flared aerodynamic surfaces) that are stowed during ascent to minimize drag and are deployed during descent to increase drag and change the aerodynamic stability properties of the RLV, including the RLV's center of pressure. By modifying drag and/or lift characteristics, the deployable flared aerodynamic control surfaces 108 can cause the RLV 100 to slow during descent. The RLV may also include other devices for slowing descent, such as one or more parachutes (not illustrated). In some embodiments (not illustrated), the RLV can deploy some aerodynamic control surfaces during ascent and slow these surfaces during descent.

Figure 1B:
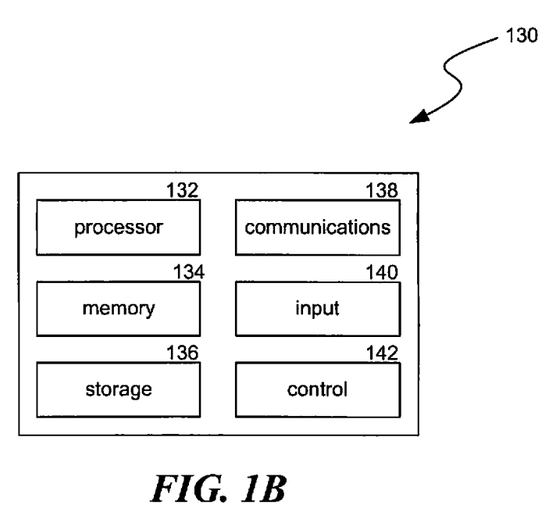
FIG. 1B is a block diagram illustrating components employed by reusable launch vehicles in accordance with various embodiments of the disclosure.

FIG. 1B is a block diagram illustrating components employed by reusable launch vehicles in accordance with various embodiments of the disclosure. The components can include a computing environment 130. The computing environment 130 can include multiple components As examples, the computing environment 130 can include one or more of each of the following components: processor 132, memory 134, storage 136, communications facility 138, input 140, and control 142.

The processor 132 can be a conventional processor or a special-purpose processor designed for use in RLVs or other space launch vehicles. Other hardware components of the computing environment 130 may similarly be either conventionally designed components or specially designed for use in RLVs or other space launch vehicles.

The memory 134 can store computer-executable instructions, data, the wind map, etc. The memory may be available to one or more processors 132 or other components.

The storage 136 can be additional (e.g., "secondary") storage employed by the computing environment. The storage may be available to one or more processors 132 or other components.

The communications facility 138 can enable data communications between the illustrated and other components. As examples, the communications facility may enable data or voice communications with ground-based systems, such as systems located at a command and control center.

The input component 140 can collect and provide input from sensors, navigation units (e.g., inertial navigation units, GPS devices, and so forth), and/or other devices and/or users. One or more processors may collect, store, and/or analyze the information collected from the sensors.

Processors can employ one or more control components 142 to command the aerodynamic control surfaces (e.g., to deploy, stow, rotate, etc.), propulsion devices (e.g., thrusters, motors, engines, etc.), and other parts of the RLV to cause the RLV to change its trajectory. The control component 142 can also be employed to control non-trajectory-oriented components, such as to control interior temperature, breathable air content, pressurization, etc.

The computing devices on which aspects of the described technology may be implemented may include one or more central processing units, memory, input devices, output devices, storage devices (e.g., disk drives), and network devices (e.g., network interfaces). The memory and storage devices are computer-readable storage media (e.g., non-transitory) that may store instructions that implement the importance system. In addition, the data structures and message structures may be stored or transmitted via a data transmission medium, such as a signal on a communications link. Various communications links may be used, e.g., to exchange information between various components and between the RLV and a ground-based system.

Figure 2:
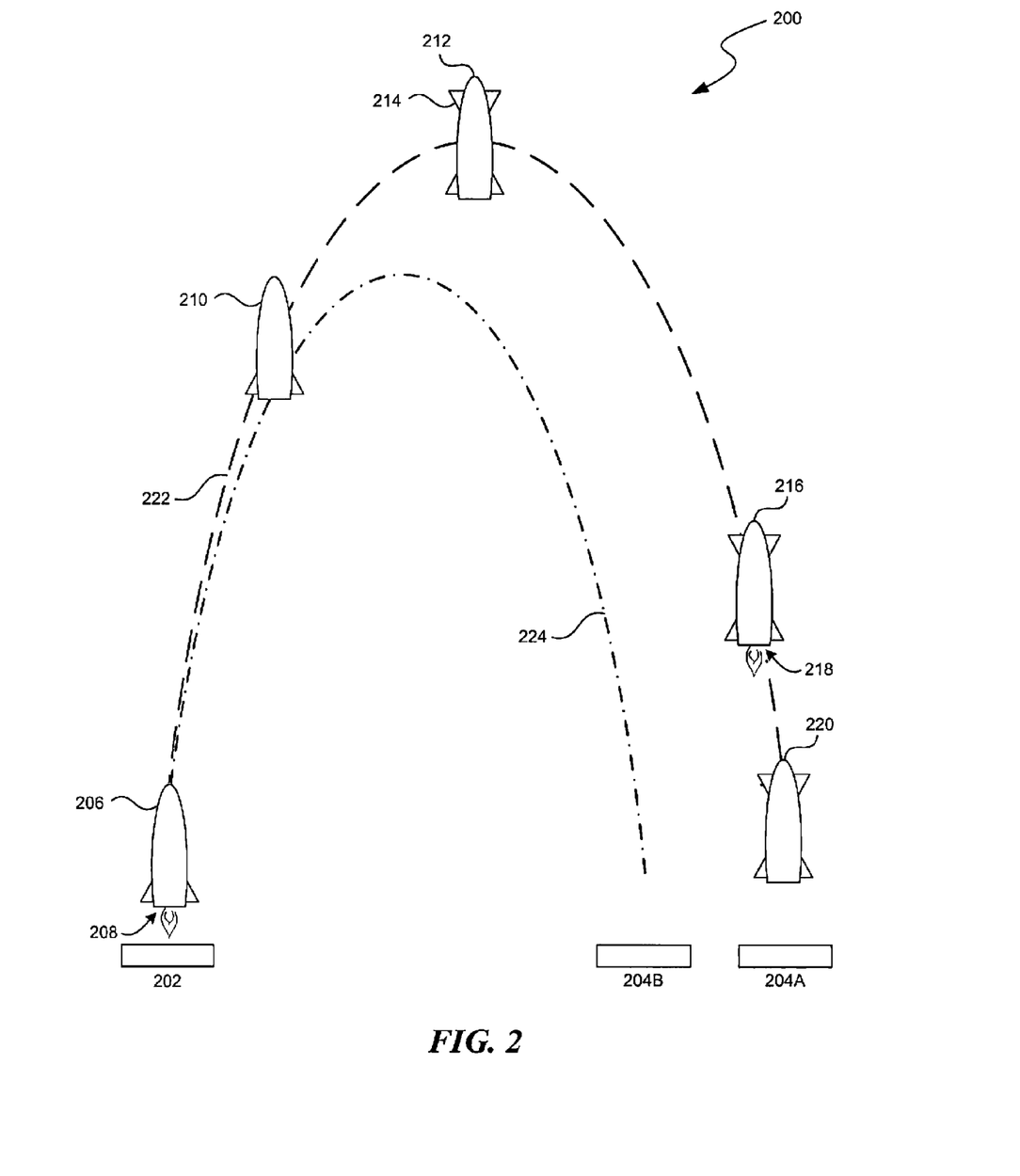
FIG. 2 is a schematic diagram illustrating a mission profile of a reusable launch vehicle in accordance with various embodiments of the disclosure.

FIG. 2 is a schematic diagram illustrating a mission profile 200 of a reusable launch vehicle in accordance with various embodiments of the disclosure. In a powered ascent configuration 206, an RLV lifts off using a propulsion device 208 from a liftoff site 202. In the powered ascent configuration 206, the RLV may direct its propulsion devices to affect its trajectory. It may also command its moveable aerodynamic control surfaces 106 to affect its trajectory (e.g., to change the trajectory based on experienced winds aloft). To control the latitude and longitude of the RLV during powered ascent, the control 142 (see FIG. 1B) can command roll, pitch, yaw attitude, attitude rate of change, acceleration and/or position. Although the RLV is illustrated as being vertically aligned throughout flight, it can enter various attitudes as appropriate to maintain a specified trajectory.

At a computed time, the RLV continues in an un-powered ascent configuration 210. In the un-powered ascent configuration 210, the RLV can command its moveable aerodynamic control surfaces 106 and propulsion devices to affect its trajectory (e.g., to change the trajectory based on experienced winds aloft).

At some point (e.g., before, at, or after achieving its apogee), the RLV can enter an un-powered descent configuration 212. In this un-powered descent configuration, the RLV can deploy its deployable flared aerodynamic control surfaces 108 (illustrated as surfaces 214).

When nearing the landing site 204A, the RLV can employ one or more propulsion devices 218 in a powered slowdown configuration 216 to further slow the RLV. In various embodiments, the RLV can employ thrusters, engines, motors, and/or moveable aerodynamic control surfaces 106 to position the RLV above the landing site 204A prior to landing. Once landing at the landing site 204A is assured, the RLV may enter an un-powered descent configuration 220 to touch down on the landing site 204A.

In some embodiments, a landing site 204A can be moveable and can include a broadcast station (not illustrated) for communicating its position and/or local wind data to the RLV 100. This information enables the RLV to continuously check and/or adjust its trajectory to enable it to land at the landing site.

Dashed line 222 is an initial desired trajectory of the RLV. However, atmospheric conditions or other factors may cause the RLV to travel on a different predicted trajectory 224, e.g., towards a site 204B. When a terminal condition (e.g., lateral position, altitude, latitude, longitude, GPS coordinates, atmospheric pressure, etc.) of the predicted trajectory does not match a specified terminal condition (e.g., specified terminal altitude, position, atmospheric pressure, time, etc.), the technology can correct the trajectory to create a new desired trajectory as described herein.

A prediction component associated with the technology can employ the vehicle model simulation to predict the future trajectory of the RLV and the vehicle control system may in real-time adjust the current trajectory to enable the RLV to land at a specified landing site using minimal application of control authority (e.g., by minimal movement or positioning of aerodynamic control surfaces). During ascent and descent, the technology can change the RLV's trajectory using propulsion or aerodynamic control surfaces. In some embodiments, the RLV's trajectory is changed during ascent using propulsion or aerodynamic control surfaces and during descent using (a) aerodynamic control surfaces until arriving at a terminal altitude above the touchdown site (e.g., 2000 feet above ground level) and then (b) using a combination of propulsion and aerodynamic control surfaces.

Figure 3A:
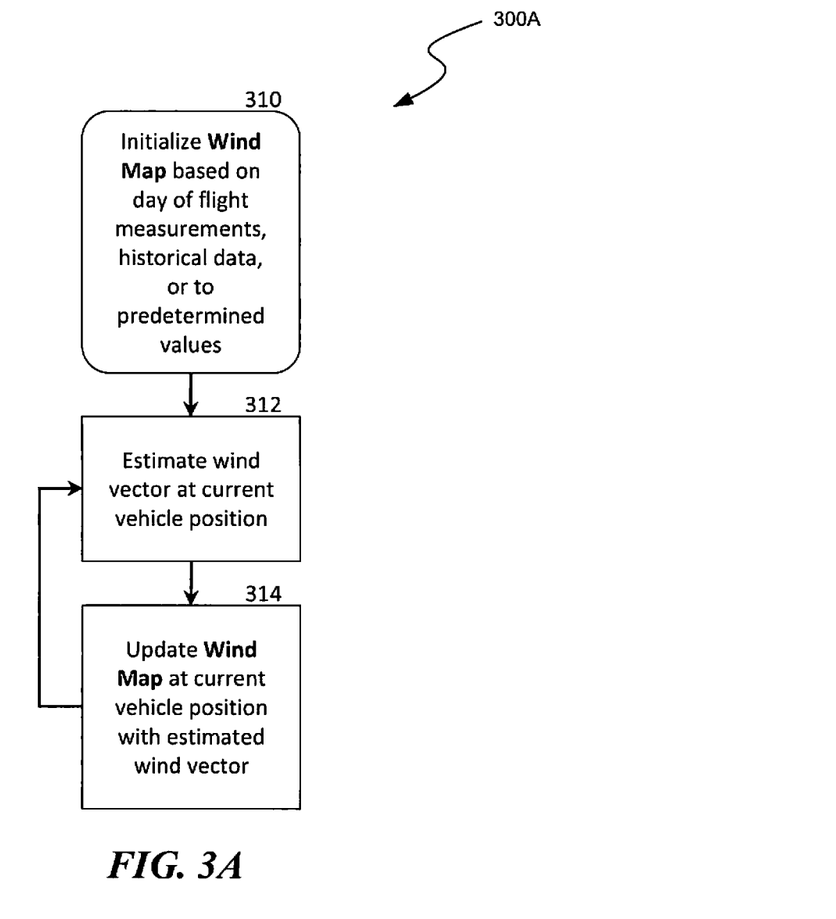
FIG. 3A is a flow diagram illustrating a routine for employing a wind map for a reusable launch vehicle in accordance with various embodiments of the disclosure.

FIG. 3A is a flow diagram illustrating a routine 300A for employing a wind map for a reusable launch vehicle in accordance with various embodiments of the disclosure. The technology can store and update an onboard wind map of wind vectors. The routine begins at block 310 prior to, at, or after liftoff, where it initializes the wind map. In some embodiments, the wind map may be initialized prior to flight based on day-of-flight wind measurements, historical wind data, etc. In some embodiments, the wind map may be initialized to zeros or other predetermined values. In either case, the wind map may then be updated during the flight trajectory. Wind measurements may be one or more of wind speed, wind direction, altitude, temperature, atmospheric pressure, etc.

At block 312, the routine may estimate the wind vector at the current vehicle position using onboard instruments and/or knowledge of vehicle aerodynamic properties.

At block 314, the technology may replace wind map data corresponding to the current vehicle position with the estimated wind data, e.g., based on estimations using onboard instruments and knowledge of vehicle aerodynamic properties, updates received from ground-based or airborne systems, etc. In some embodiments, the estimated wind at the current vehicle position may be used to predict and update the wind map elements corresponding to nearby positions.

Those skilled in the art will appreciate that the logic illustrated in FIG. 3A and described above, and in each of the flow diagrams discussed below, may be altered in various ways. For example, the order of the logic may be rearranged, substeps may be performed in parallel, illustrated logic may be omitted, other logic may be included, etc.

Figure 3B:
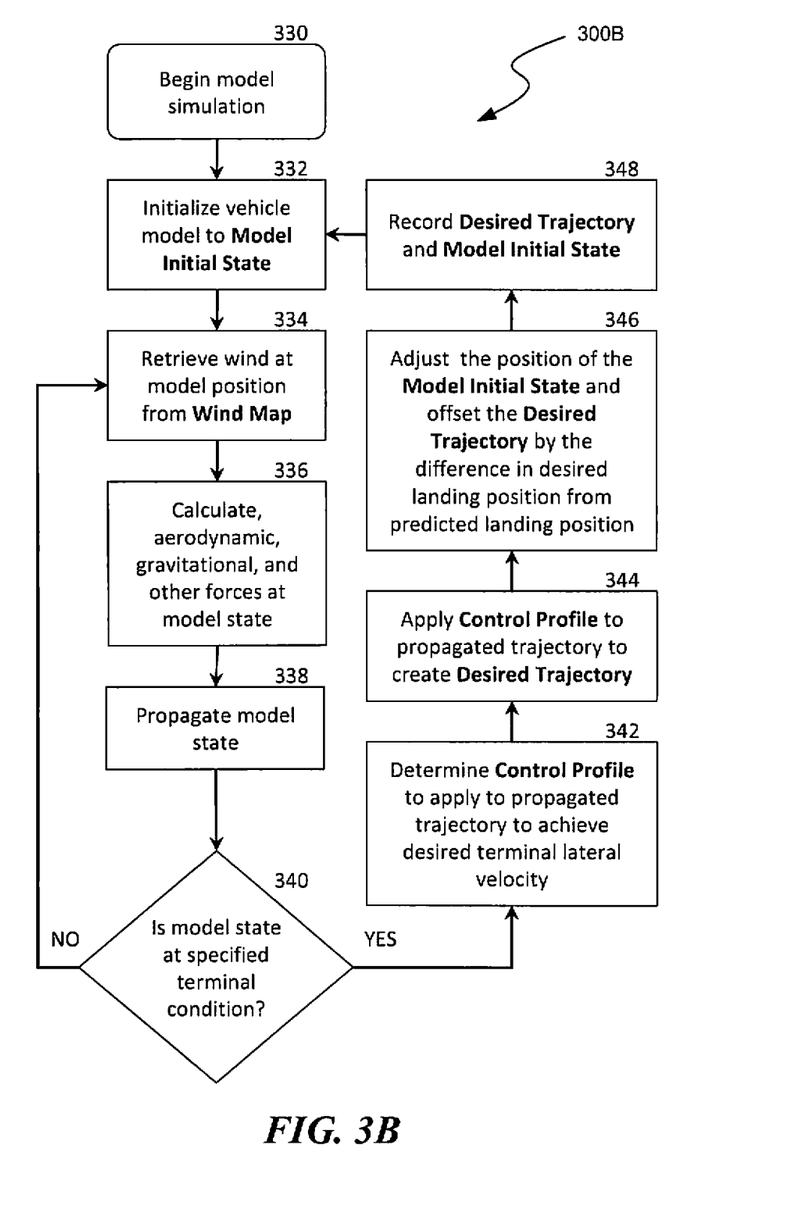
FIG. 3B is a flow diagram illustrating a routine for implementing a vehicle model simulation for a reusable launch vehicle in accordance with various embodiments of the disclosure.

FIG. 3B is a flow diagram illustrating a routine 300B for implementing a vehicle model simulation for a reusable launch vehicle in accordance with various embodiments of the disclosure. At block 330, the vehicle model simulation begins. The routine can be executed prior to, at, or after liftoff. In some embodiments, model simulation may begin prior to flight and simulation may take place using a pre-flight estimate of the wind map. In some embodiments, model simulation may begin at or after liftoff, when in-flight updating of the wind map has begun.

At block 332, the routine initializes state and mass properties of a computer model of the RLV. The model describes the characteristics of the RLV, such as by using a set of differential equations, and can be employed to predict the RLV's behavior in real-time and in the future. As an example, the RLV's predicted velocity and position at a future time can be predicted based on its present velocity, speed, acceleration, mass, expected future wind conditions, and expected future control forces.

In some embodiments, the routine may initialize the state and mass properties based on the expected rigid-body state of the vehicle at a main engine cutoff ("MECO") time, which is a time during ascent at which the RLV disables main propulsion.

In some embodiments, the routine may initialize the state and mass properties based on some future state other than MECO, such as a state at which the RLV will encounter atmospheric density sufficient to enable effective use of aerodynamic surface control on descent.

At block 334, the routine retrieves a wind vector at the current position of the vehicle model in the simulation from the wind map.

At block 336, the routine determines forces acting on the vehicle model at the current simulation state. In various embodiments, the model can account for forces and torques affecting the motion of the RLV. Factors used in these calculations may include but are not limited to gravity, aerodynamics, wind, mass, velocity, propulsion, and aerodynamic control surface orientation, etc.

At block 338, the routine propagates the model state to a future time and records information describing the shape of the predicted trajectory.

At decision block 340, the routine determines whether the model state has reached a specified terminal condition. Examples of terminal conditions can include, e.g., altitude, position, atmospheric pressure, time, etc. In some embodiments, e.g., for vehicles that land vertically using rocket engines, the terminal condition may be an altitude at which the RLV shifts from using aerodynamic surfaces for descent control to using propulsion. In other embodiments, the terminal condition may be the altitude of the landing site. If the model state has met the terminal condition, the routine continues at block 342. Otherwise, the routine returns to block 334. Thus, the routine performs the logic of block 334-340 iteratively to create a series of waypoints describing the predicted trajectory of the vehicle between the model initial state and the specified terminal condition.

At block 342, the routine computes a reference feed-forward control profile that, when applied to the predicted trajectory, can result in a terminal lateral velocity equal to the desired lateral velocity at the terminal condition. Lateral velocity is the component of the RLV's velocity vector that lies in the horizontal plane. Lateral positions and velocities may be referenced in relation to the Earth's surface (e.g., latitude, longitude, GPS coordinates, etc.). The control profile may be non-zero for part or all of the trajectory.

In some embodiments, the control profile may be determined by dividing the lateral velocity at the terminal altitude of a predicted free-fall trajectory by a transition duration, and then applying the resulting acceleration throughout the transition duration. In these embodiments, the transition duration may be different in the East and North axes, and can be determined in each axis as one of the following two quantities:
 1. the time expected for the RLV to fall from a specified threshold altitude to the terminal altitude (the threshold altitude can pre-determined such that the vehicle has good control authority below that altitude); or
 2. the time required to decelerate to the desired terminal lateral velocity given a reference lateral acceleration profile based on the control authority of the RLV. In some embodiments, the acceleration profile may be a pre-determined maximum acceleration profile.

In various embodiments, other approaches can be employed to improve the fidelity and utility of the Control Profile generation algorithm, including, e.g.: (a) employing a model of the control system and simulating the effects of applying control to produce the profile (the control application could be modeled only below a specified threshold altitude to reduce the computational burden); or employing the control profile from a previous prediction iteration to determine the trajectory for the current iteration (which may cause little additional computational burden and could significantly improve the fidelity of the resulting trajectory and feed-forward compensation signals).

At block 344, the routine applies the reference Control Profile to the predicted trajectory, resulting in a desired trajectory.

At block 346, the routine offsets the initial position of the model initial state and the entire desired trajectory by the error in the terminal lateral position of the desired trajectory. This results in a lateral position error of zero at the end of the desired trajectory.

At block 348, the model initial state and desired trajectory are recorded. The routine then returns to block 332 to begin the simulation loop using the new value of the model initial state. By iteratively performing the simulation loop and updating the model initial state, the routine is able to determine a target state for the vehicle (e.g., the model initial state), a reference trajectory to follow after reaching that target state (the desired trajectory), and a reference feed-forward control profile that will cause the RLV to reach the desired terminal state.

Figure 3C:
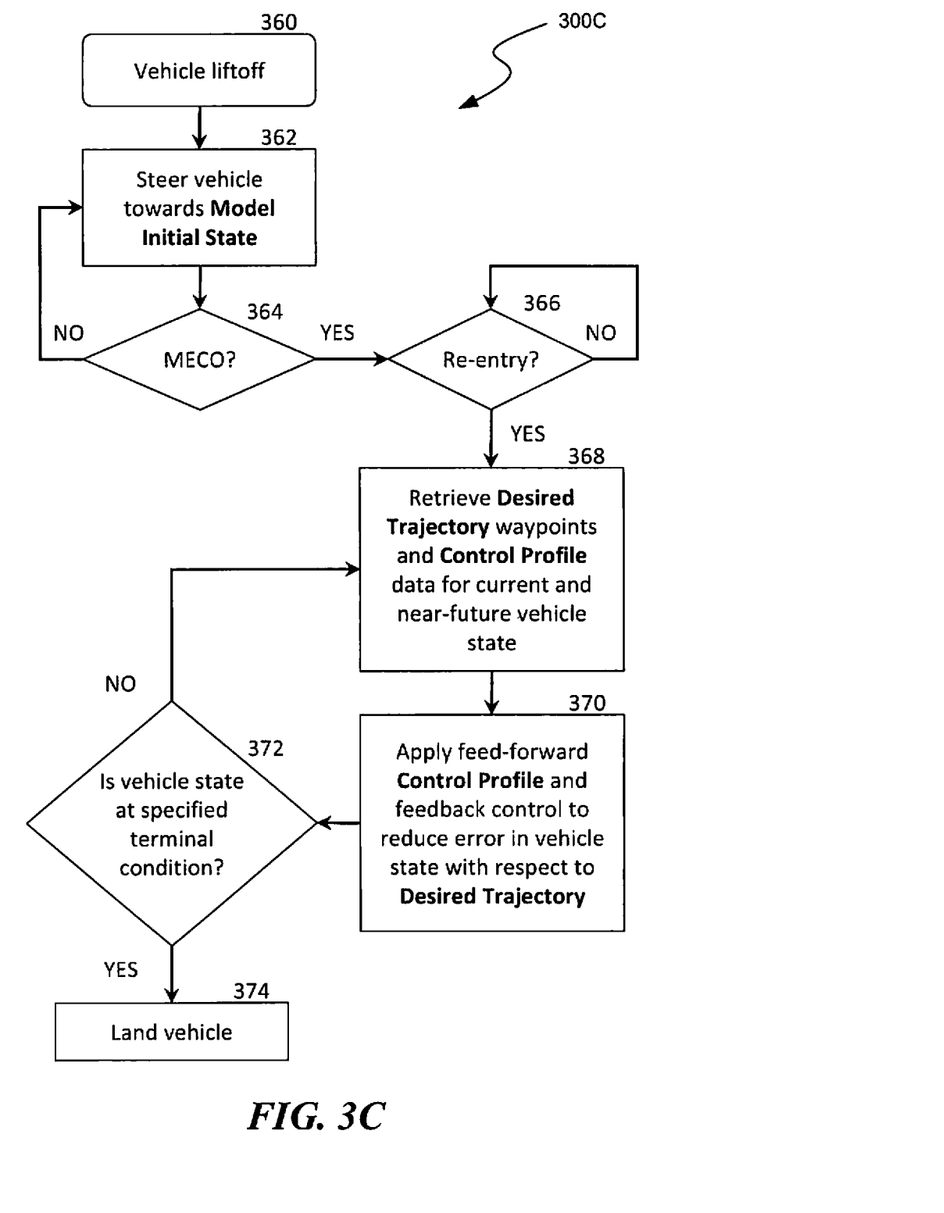
FIG. 3C is a flow diagram illustrating a routine for controlling a flight trajectory of a reusable launch vehicle in accordance with various embodiments of the disclosure.

FIG. 3C is a flow diagram illustrating a routine 300C for controlling flight trajectory of a reusable launch vehicle in accordance with various embodiments of the disclosure. The routine begins at block 360, e.g., when the vehicle lifts off.

At block 362, the vehicle guidance and control law steers the vehicle towards the model initial state (e.g., the target state at MECO), e.g., by controlling motors, thrusters, aerodynamic control surfaces, etc. The technology may control these devices using actuators or other means.

At decision block 364, the routine determines if the vehicle has reached MECO. If so, the routine continues at decision block 366. If not, the routine returns to block 362.

In some embodiments, the RLV can employ a reaction control system (i.e. thrusters) after MECO to provide small velocity corrections to counteract errors that may accumulate during shutdown of the main propulsion.

At decision block 366, the routine determines if the vehicle has reached re-entry, e.g., defined in some embodiments as the state at which active guidance may begin during descent. In various embodiments, re-entry may occur at a time after apogee when the dynamic pressure is sufficiently high for aerodynamic control surfaces to be effective in guiding the vehicle.

If the vehicle has reached re-entry, the routine continues to block 368. Otherwise, the routine remains at block 366.

In various embodiments, once the vehicle has reached re-entry, the model initial state may be updated to the state of the vehicle at re-entry, so that a new desired trajectory may be calculated. In various embodiments, the technology may improve the fidelity of the trajectory during descent, e.g., by continuing to update the model initial state and recalculating new trajectories repeatedly after meeting the re-entry condition and beginning guided descent.

At block 368, the routine retrieves data from the desired trajectory and reference feed-forward control profile that correspond to the current and near-future vehicle state.

At block 370, the routine applies control to the vehicle to reduce error in the actual trajectory with respect to the desired trajectory. The control may consist of a feed-forward component from the reference control profile and a feedback component based on error in tracking the desired trajectory. In various embodiments, the control may be applied using aerodynamic control surfaces, thrusters, main propulsion, or other means.

At decision block 372, the routine determines whether the RLV has reached the desired terminal condition. If the RLV has reached the terminal condition, the routine continues to block 374. Otherwise, the routine returns to block 368.

In some embodiments the terminal condition may be an altitude at which a vertical-landing rocket enables main propulsion and begins engine-on deceleration. In these embodiments, the routine turns on propulsion devices to slow descent before landing the RLV. Aerodynamic control surfaces can also be used if there is sufficient speed relative to the winds. For a vertical-landing vehicle near the ground, the speed of the vehicle can be low and the effectiveness of aerodynamic control surfaces may be very small relative to the forces produced by the rocket engines.

At block 374, the RLV lands. In some embodiments, the RLV may land vertically using rocket engines (e.g., to slow vertical descent). In other embodiments, the RLV may land horizontally like an aircraft.

Thus, the routine continually predicts the trajectory of the RLV and commands aerodynamic control surfaces or propulsion devices, as appropriate, to cause the RLV to descend to the landing site with a near-zero terminal lateral velocity error. In various embodiments, the terminal lateral velocity is zero or near-zero when the landing site is a fixed surface and the RLV lands vertically. In other embodiments, the terminal lateral velocity is the velocity of a moving landing site (e.g., a water-based vehicle, such as a sea barge).

Any or all of the three routines 3A, 3B, and 3C may be executed concurrently. FIG. 3A illustrates a routine for creation and update of a wind map. FIG. 3B illustrates a routine for predicting a free-fall trajectory of the RLV from a model initial state to a terminal state, and determining how the free-fall trajectory (which may depend on wind conditions) should be changed using feed-forward control so that the RLV will arrive at a specified terminal state. FIG. 3C illustrates a routine for adjusting guidance of the RLV during in flight so that the RLV arrives at the model initial state.

In various embodiments, the routines enable monitoring and control of the amount of energy (e.g., propellant) employed to cause the RLV to land at a specified landing site. Thus, the model can be employed to limit or minimize various cost functions, such as propellant burn, movement of aerodynamic control surfaces, recovery time, safety of RLV occupants or others, etc.

RLVs can employ one or more computing devices that each or in combination may include one or more central processing units, memory, input devices, output devices, and storage devices. The memory and storage devices are computer-readable media that may be encoded with data structures and computer-executable instructions. In addition, the instructions, data structures, and message structures may be stored or transmitted via a data transmission medium, such as a signal on a communication link. Various communication links may be used to exchange information between the RLV and Earth-based facilities, such as a command and control center.

Thus, by predicting the RLV's position at a terminal altitude and commanding corrections in the trajectory (e.g., up until MECO), the technology can attempt to satisfy one or more constraints. As an example, the technology can attempt to ensure that the RLV has sufficient propellant to land at a specified landing site. As another example, the RLV can arrive at a terminal altitude above the landing site with near-zero lateral velocity so that it has sufficient remaining propellant to employ its propulsion devices to reduce its speed and land at the specified landing site. The technology provides this and other advantages that will be readily apparent to one skilled in the art.

The presently disclosed technology may be described and implemented in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In various embodiments, the apogee of the flight trajectory can be up to 350,000 feet above the surface of the earth or higher.

In various embodiments, the landing site can be the same site as the liftoff site, some yards away, a few miles away, hundreds of miles away, or thousands of miles away. The landing site may be a sea-based moveable landing site (e.g., a sea-going platform). In various embodiments, the RLV or the moveable landing site may predict the position of the moveable landing site at the time of landing and guide the RLV and/or the landing site appropriately. As an example, the moveable landing site may include technology to predict and correct its position to arrive at the location where the RLV will land in time for the landing. Alternatively (or in addition), the RLV may receive information from the moveable landing site so that the RLV can predict and correct for the landing site's location at the time of landing and/or the wind at the landing site location at the time of landing. The sea-going platform can include a broadcast station for communicating its position to the RLV in real-time. This information can enable the RLV to continually check and/or adjust its flight path to target the sea-going platform. If the sea-going platform is a freely-drifting craft, the sea-going platform can also include a platform position predictor (e.g., a suitable processing device, memory, and associated computer-executable instructions) that automatically predicts a future position of the sea-going platform based on various existing conditions such as the strength and direction of the marine current, the strength and direction of the wind, the present rate and direction of drift, etc. For example, the platform position predictor can be configured to predict the position of the sea-going platform at the expected time of RLV touchdown. Moreover, the broadcast station can transmit this information to the RLV in real-time, so that the RLV can utilize this information to adjust its flight path and better target the landing location.

In particular embodiments, the technology employs aerodynamic control surfaces and thrusters or engines to control direction. In other embodiments, the technology controls the RLV directly (e.g., by specifying a particular altitude, latitude, and longitude at which the RLV is to be at a specified time).

Although several embodiments of the technology cause the RLV to land at a specified landing site with near-zero terminal lateral velocity, the technology can achieve other objectives in other embodiments. As an example, the RLV can be commanded to quickly determine suitable commands to cause the RLV to land at a different landing site than was originally programmed.

In various embodiments, the technology can be applied to vehicles that do not take off and/or land vertically.

In various embodiments, the RLV can be a multi-stage space launch vehicle. In these embodiments, the RLV may shed one or more stages after liftoff. The technology can be applied to one or more of the stages. As an example, the prediction and correction of trajectory can be applied to each stage independently.

Figure 4:
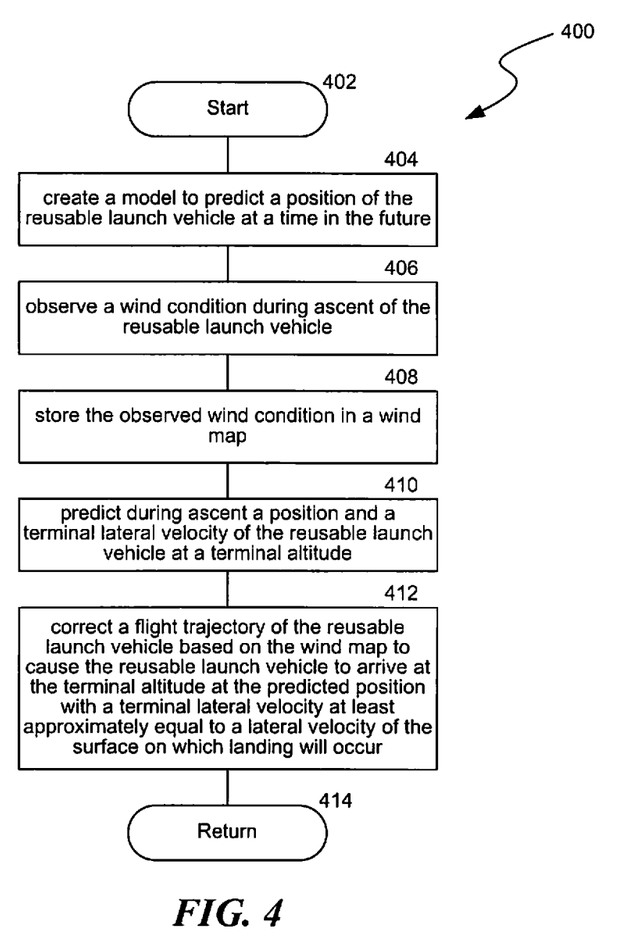
FIG. 4 is a flow diagram illustrating a routine for predicting and correcting a trajectory of a reusable launch vehicle in accordance with various embodiments of the disclosure.

In various embodiments, the technology can perform a method 400 (see FIG. 4), e.g., to create a model to predict a position of the at least partially reusable launch vehicle at a time in the future 404; observe a wind condition during ascent of the reusable launch vehicle 406; store the observed wind condition in a wind map 408; predict during ascent a position and a terminal lateral velocity of the reusable launch vehicle at a terminal altitude 410; and correct a flight trajectory of the reusable launch vehicle based on the wind map to cause the reusable launch vehicle to arrive at the terminal altitude at the predicted position with a terminal lateral velocity at least approximately equal to a lateral velocity of the surface on which landing will occur 412. The technology can compute a cost function so that the cost function results in a value substantially equal to zero at the terminal altitude. The cost function can be based on propellant usage. The technology can receive information from a moveable landing site. The information can be used to predict a position of the moveable landing site at the time of landing. The lateral velocity of the surface on which landing will occur may be zero when the surface is a fixed surface. The lateral velocity of the surface on which landing will occur may be zero when the surface is a moveable landing site. The lateral velocity of the surface on which landing will occur may not be zero when the surface is a moveable landing site. The technology may store information received from an external data source in the wind map.

The external data source can be a weather prediction service. The information received from the external data source may be stored before liftoff, during ascent, or during descent. The information may be current wind data, historical wind data, or predicted wind data. The historical wind data may be modified during ascent with data observed during ascent.

In various embodiments, the correcting can occur while the at least partially reusable launch vehicle descends. The technology can create a model to predict a position of the at least partially reusable launch vehicle at a time in the future. The technology can observe wind conditions with a periodicity (e.g., 100 milliseconds), and this periodicity may vary depending on the phase of flight (e.g., ascent, after MECO, descent, etc.). The at least partially reusable launch vehicle may arrive at the terminal altitude with a terminal lateral velocity at least approximately equal to a lateral velocity of the surface on which landing will occur. As an example, when the landing site is movable, the at least partially reusable launch vehicle (RLV) may arrive at the same lateral velocity. When the landing site is not movable (e.g., a stationary surface), the lateral velocity is approximately equal to zero. The technology may compute a difference between the predicted lateral velocity at the terminal altitude and the lateral velocity of the surface on which landing will occur; and correct the flight trajectory to reduce the computed difference. In various embodiments, the lateral velocity of the RLV may exceed that of the landing site (e.g., when the RLV lands non-vertically).

The RLV may take off and land at the same or different sites in various embodiments.

In various embodiments, the RLV may correct the flight trajectory during descent. Whether correcting during ascent, descent, or otherwise, the correcting can include providing instructions for one or more of engine throttle control, thruster control, flight control surface movement or position, etc.

In various embodiments, the technology may include computer-readable storage medium for storing instructions for predicting and correcting a trajectory.

In various embodiments, the technology may include a system employed by a reusable launch vehicle for predicting and correcting a trajectory. The system may include a component configured to create a model to predict a position of the reusable launch vehicle at a time in the future; a component configured to observe a wind condition during ascent of the reusable launch vehicle; a component configured to store the observed wind condition in a wind map; a component configured to predict during ascent a position and a terminal lateral velocity of the reusable launch vehicle at a terminal altitude; and a component configured to correct a flight trajectory of the reusable launch vehicle based on the wind map to cause the reusable launch vehicle to arrive at the terminal altitude at the predicted position with a terminal lateral velocity at least approximately equal to a lateral velocity of the surface on which landing will occur. The wind map may be stored in a computer-readable storage medium associated with the reusable launch vehicle and configured to be accessible by a processor associated with either the reusable launch vehicle or a ground-based system.

The present disclosure is directed generally to vertical powered landings of reusable RLVs. Certain details are set forth above to provide a thorough understanding of various embodiments of the disclosure. Those of ordinary skill in the relevant art will appreciate, however, that other embodiments having different configurations, arrangements, and/or components may be practiced without several of the details above. For example, other embodiments of the disclosure may include additional elements, or may lack one or more of the elements or features described above. Moreover, several details describing structures and processes that are well-known and often associated with RLVs and launching and landing RLVs are not set forth to avoid unnecessarily obscuring the various embodiments of the disclosure.

Although the subject matter has been described in language specific to structural features and/or methodological acts, it is to be understood that the subject matter is not necessarily limited to the specific features or acts described above. The following claims provide additional embodiments of the disclosure.

We claim:

1. A method performed by an at least partially reusable launch vehicle for predicting and correcting a flight trajectory, comprising:
   observing a wind condition during ascent of the at least partially reusable launch vehicle;
   storing the observed wind condition in a wind map;
   predicting during ascent and before main engine cutoff a terminal condition of the at least partially reusable launch vehicle based in part on the wind map;
   determining whether the terminal condition is approximately equal to a specified condition; and
   correcting the flight trajectory of the at least partially reusable launch vehicle so that the specified condition is approximately consistent with a desired trajectory.

2. The method of claim 1 wherein the correcting occurs while the at least partially reusable launch vehicle descends.

3. The method of claim 1 further comprising creating a model to predict a position of the at least partially reusable launch vehicle at a time in the future.

4. The method of claim 1 wherein the observing occurs with a periodicity.

5. The method of claim 4 wherein the periodicity is variable depending on a phase of flight.

6. The method of claim 1 wherein the at least partially reusable launch vehicle arrives at the terminal altitude with a terminal lateral velocity at least approximately equal to a lateral velocity of a surface on which landing will occur.

7. The method of claim 6 wherein the lateral velocity is approximately equal to zero.

8. The method of claim 6 further comprising computing a difference between the predicted lateral velocity at the terminal altitude and the lateral velocity of the surface on which landing will occur; and correcting the flight trajectory to reduce the computed difference.

9. The method of claim 1 wherein the at least partially reusable launch vehicle takes off and lands at the same site.

10. The method of claim 1 wherein the positions are lateral positions measured in relation to the Earth's surface.

11. The method of claim 1 further comprising correcting the flight trajectory during descent.

12. The method of claim 1 wherein the correcting includes providing instructions for engine throttle control.

13. The method of claim 1 wherein the correcting includes providing instructions for thruster control.

14. The method of claim 1 wherein the correcting includes providing instructions for flight control surface movement or position.

15. The method of claim 1 wherein the at least partially reusable launch vehicle has a lateral speed at terminal altitude that exceeds a lateral speed of the landing site.

16. The method of claim 1 further comprising computing a cost function so that the cost function results in a value substantially equal to zero at the terminal altitude.

17. The method of claim 16 wherein the cost function is based on propellant usage.

18. The method of claim 16 wherein the cost function is based on movement of an aerodynamic control surface.

19. The method of claim 1 further comprising receiving information from a moveable landing site.

20. The method of claim 19 wherein the information is used to predict a position of the moveable landing site at the time of landing.

21. The method of claim 1 wherein the lateral velocity of the surface on which landing will occur is zero when the surface is a fixed surface.

22. The method of claim 1 wherein the lateral velocity of the surface on which landing will occur is nearly zero when the surface is not a moveable landing site.

23. The method of claim 1 wherein the lateral velocity of the surface on which landing will occur is not zero when the surface is a moveable landing site.

24. The method of claim 1 further comprising storing in the wind map information received from an external data source.

25. The method of claim 24 wherein the external data source is a weather prediction service.

26. The method of claim 24 wherein the information received from the external data source is stored before liftoff.

27. The method of claim 24 wherein the information received from the external data source is stored during ascent.

28. The method of claim 24 wherein the information received from the external data source is stored during descent.

29. The method of claim 24 wherein the information is historical wind data and the historical wind data is modified during ascent with data observed during ascent.

30. A computer-readable memory device for storing instructions for predicting and correcting a trajectory, comprising instructions for:
   computing a model to predict a position of an at least partially reusable launch vehicle at a time in the future;
   observing a wind condition during ascent of the reusable launch vehicle;
   storing the observed wind condition in a wind map;
   predicting during ascent at least using the model and the wind map a position of the reusable launch vehicle at a terminal altitude; and
   correcting during ascent and before main engine cutoff a flight trajectory of the reusable launch vehicle to cause the reusable launch vehicle to arrive at the terminal altitude in a specified condition.

31. The computer-readable memory device of claim 30 wherein the specified condition is a desired position.

32. The computer-readable memory device of claim 30 wherein the specified condition is a desired lateral velocity.

33. A system employed by an at least partially reusable launch vehicle for predicting and correcting a trajectory, comprising:
   one or more processors and memories;
   a component configured to observe a wind condition during ascent of the reusable launch vehicle;
   a component configured to store the observed wind condition in a wind map;
   a component configured to predict during ascent and before main engine cutoff a condition of the reusable launch vehicle at a terminal altitude; and
   a component configured to correct a flight trajectory of the reusable launch vehicle based at least partially on the wind map to cause the reusable launch vehicle to arrive at the terminal altitude in a desired condition.

34. The system of claim 33 wherein the wind map is stored in a computer-readable storage medium associated with the reusable launch vehicle and configured to be accessible by a processor associated with either the reusable launch vehicle or a ground-based system.

35. The system of claim 33 wherein the desired condition is a lateral position.

36. The system of claim 33 wherein the desired condition is a lateral velocity.

* * * * *